(12) United States Patent
Hall

(10) Patent No.: US 8,445,258 B2
(45) Date of Patent: May 21, 2013

(54) RECYCLING OF WASTE MATERIAL

(75) Inventor: Philip Hall, Sevenoaks (GB)

(73) Assignee: VWP Waste Processing Limited, London (GB)

( * ) Notice: Subject to any disclaimer, the term of this patent is extended or adjusted under 35 U.S.C. 154(b) by 765 days.

(21) Appl. No.: 12/309,845

(22) PCT Filed: Aug. 1, 2007

(86) PCT No.: PCT/GB2007/002920
§ 371 (c)(1),
(2), (4) Date: Jan. 30, 2009

(87) PCT Pub. No.: WO2008/015424
PCT Pub. Date: Feb. 7, 2008

(65) Prior Publication Data
US 2010/0003548 A1    Jan. 7, 2010

(30) Foreign Application Priority Data

Aug. 1, 2006 (GB) .................................. 0615290.4
May 1, 2007 (GB) .................................. 0708405.6

(51) Int. Cl.
*C02F 3/34* (2006.01)
*C07C 1/00* (2006.01)
*C07C 4/00* (2006.01)
*C10G 1/00* (2006.01)
*C10G 1/10* (2006.01)

(52) U.S. Cl.
USPC ............ 435/262; 585/240; 585/241; 585/242

(58) Field of Classification Search .......... 435/162–168, 435/262, 289.1, 290.1–290.3, 209.1; 210/767, 210/673; 585/240, 241, 242
See application file for complete search history.

(56) References Cited

U.S. PATENT DOCUMENTS

| | | | |
|---|---|---|---|
| 4,009,075 A | * | 2/1977 | Hoge ............................. 435/162 |
| 4,342,830 A | | 8/1982 | Holloway |
| 5,079,385 A | * | 1/1992 | Wu ................................ 585/241 |

(Continued)

FOREIGN PATENT DOCUMENTS

| | | |
|---|---|---|
| DE | 3544240 A1 | 6/1987 |
| WO | WO 03024633 A | 3/2003 |

(Continued)

OTHER PUBLICATIONS

International Search Report for PCT/GB2007/002920, Date of mailing: Jan. 15, 2008.

(Continued)

*Primary Examiner* — Michael Marcheschi
*Assistant Examiner* — Shanta G Doe
(74) *Attorney, Agent, or Firm* — Hamilton, Brook, Smith & Reynolds, P.C.

(57) ABSTRACT

A process and apparatus for recycling municipal domestic waste comprises subjecting the waste to steam at 150° C.-200° C. at above atmospheric pressure but less than twice atmospheric pressure, After steam treatment, the resultant material is separated into constituent parts and biomass and/or plastics subjected to further treatment: The further treatment preferably produces bioethanol from the biomass and diesel from the plastics. As an alternative, some or all of the biomass may be gasified in order to produce hydrogen which may, in turn be fed to a fuel cell to produce an electrical output.

11 Claims, 5 Drawing Sheets

U.S. PATENT DOCUMENTS

| | | | |
|---|---|---|---|
| 5,190,226 A | 3/1993 | Holloway | |
| 5,407,817 A | 4/1995 | Lightsey et al. | |
| 5,414,169 A * | 5/1995 | Takahashi et al. | 585/241 |
| 5,506,123 A | 4/1996 | Chieffalo et al. | |
| 5,556,445 A | 9/1996 | Quinn et al. | |
| 5,571,703 A | 11/1996 | Chieffalo et al. | |
| 5,655,718 A * | 8/1997 | Anderson | 241/17 |
| 5,779,164 A | 7/1998 | Chieffalo et al. | |
| 5,849,964 A * | 12/1998 | Holighaus et al. | 585/241 |
| 5,968,362 A | 10/1999 | Russo, Jr. | |
| 5,975,439 A | 11/1999 | Chieffalo et al. | |
| 6,017,475 A * | 1/2000 | Cantrell | 264/140 |
| 6,267,309 B1 | 7/2001 | Chieffalo et al. | |
| 6,328,234 B1 | 12/2001 | Saucier et al. | |
| 6,391,204 B1 | 5/2002 | Russo, Jr. | |
| 6,419,828 B1 | 7/2002 | Russo, Jr. | |
| 6,752,337 B2 | 6/2004 | Koenig | |
| 6,752,956 B1 | 6/2004 | Vanderwal | |
| 7,175,115 B1 * | 2/2007 | Gali | 241/19 |
| 2003/0078552 A1 * | 4/2003 | Tepper et al. | 604/333 |
| 2003/0199049 A1 | 10/2003 | Nguyen et al. | |
| 2004/0025715 A1 | 2/2004 | Bonde et al. | |
| 2006/0154352 A1 * | 7/2006 | Foody et al. | 435/161 |
| 2007/0197852 A1 * | 8/2007 | Wilson et al. | 588/318 |
| 2011/0185624 A1 | 8/2011 | Hall | |

FOREIGN PATENT DOCUMENTS

| | | |
|---|---|---|
| WO | WO 2006095199 | 9/2006 |
| WO | WO 2008/015424 A2 | 2/2008 |
| WO | WO 2009/095693 | 8/2009 |

OTHER PUBLICATIONS

International Search Report for PCT/GB2009/000276, Date of mailing: Oct. 22, 2009.

Written Opinion for PCT/GB2009/000276, Date of mailing: Oct. 22, 2009.

* cited by examiner

RECYCLING OF WASTE MATERIAL

RELATED APPLICATIONS

This application is the U.S. National Stage of International Application No. PCT/GB2007/002920, filed Aug. 1, 2007, published in English, and claims priority under 35 U.S.C. §119 or 365 to GB 0615290.4, filed Aug. 1, 2006, and GB 0708405.6, filed May 1, 2007.

FIELD OF THE INVENTION

The present invention relates to the recycling of waste material and more particularly to the recycling of municipal domestic waste.

BACKGROUND OF THE INVENTION

There are a number of ways of dealing with municipal domestic waste, otherwise known as municipal solid waste, but the two most common methods are either by landfill or by incineration. Both these methods have inherent problems associated with them. When utilising landfill, the waste is buried without sorting. It takes up valuable space and renders land unusable for many years. In addition, toxic effluent can leak into the land. Further, suitable locations for landfill sites are becoming increasingly difficult to find.

As far as incineration is concerned, this usually requires the waste to be sorted into combustible and non-combustible waste with the non-combustible waste being sent to a landfill site and the combustible waste burnt. However, the burning of waste usually creates sulphur emissions and requires high unsightly chimneys. Additionally, incinerators are not efficient because they require high energy inputs.

More recently, there have been proposals to dispose of municipal waste by utilising an autoclave charged with the waste material to be treated and supplied with steam from a steam accumulator. An example of this is disclosed in U.S. Pat. No. 5,190,226 where solid waste material is processed at pressure of 4 bar. While these proposals are a more environmentally friendly solution than the two previous common methods described above, they are inefficient as they are batch processes. A continuous process has been developed in e.g. U.S. Pat. No. 6,752,337 but special equipment has been proposed in order to maintain a highly pressurized steam processing unit which is both expensive and hazardous.

SUMMARY OF THE INVENTION

The invention is directed to a method and apparatus for treating domestic waste.

In one embodiment, a process for treating domestic waste material includes shredding material to be treated and then subjecting the shredded material to steam treatment at a pressure above atmospheric pressure but less than one bar above atmospheric pressure and at a temperature of 150° C. and 200° C. by continuously moving material from one end of this steam treatment unit to the other while agitating the material.

In another embodiment, the invention includes an apparatus for treating waste material including paper, plastics and metals. An elongate vessel of the apparatus has an inlet at one end and an outlet at the other end, means for continuously moving the waste material from the inlet to the outlet and means for supplying steam to the interior of the vessel along its length, whereby to cause the interior to be at a pressure above atmospheric pressure but less than one bar above atmospheric pressure at a temperature between 150° C. and 200° C.

Further examples of prior art include WO-A-03/024633, U.S. Pat. No. 6,752,956, DE-A-3544240, and US-A1-2004/0025715.

WO-A-03/024633 discloses an autoclave charged with waste material to be treated and supplied with steam from a steam accumulator to produce in the autoclave a temperature in excess of 130° C. at a pressure in excess of 2 bar for at least 20 minutes whilst the waster material is processed. Rotation of said autoclave, together with vanes in its interior, help the steam to treat the material, which after removal from the autoclave is conveyed to a rotary screen to separate out particles of the treated material having a size less than 25 mm. A steam generation system incorporating the steam accumulator is preferably used with the autoclave to allow the waste material to operate efficiently.

U.S. Pat. No. 6,752,956 discloses a control system for processing waste. The system controls pressure and temperature in a treatment vessel to provide a more efficient process. A system for shredding the waste in the vessel is used to improve process efficiency and provides a more compact waste product.

DE-A-3544240 discloses a cleaning process to separate oil and grease from metal waste in preparation for further processing. During said cleaning process small-sized waste is subjected in a rotary kiln to superheated steam from 1.2 to 3 bar and 120° C. to 300° C.

US-A1-2004/0025715 discloses an anaerobic process of digestion of animal manures, energy crops and similar organic substrates. The process is capable of refining nutrients comprised in the digested biomass to fertilizers of commercial quality.

The present invention provides a solution to recycling municipal domestic waste which is both energy efficient and environmentally friendly. The process plant is modular in design and will take unsorted waste and thermally treat it using a continuous steam process. Preferably the system also addresses the problem of odour generated from the plant.

BRIEF DESCRIPTION OF THE FIGURES

In order that the present invention be more readily understood, an embodiment thereof will now be described by way of example with reference to the accompanying drawings in which:—

DETAILED DESCRIPTION OF THE INVENTION

The present invention generally is directed to a method and apparatus for recycling of waste material, and more particularly to the recycling of municipal domestic waste.

Figure 1:
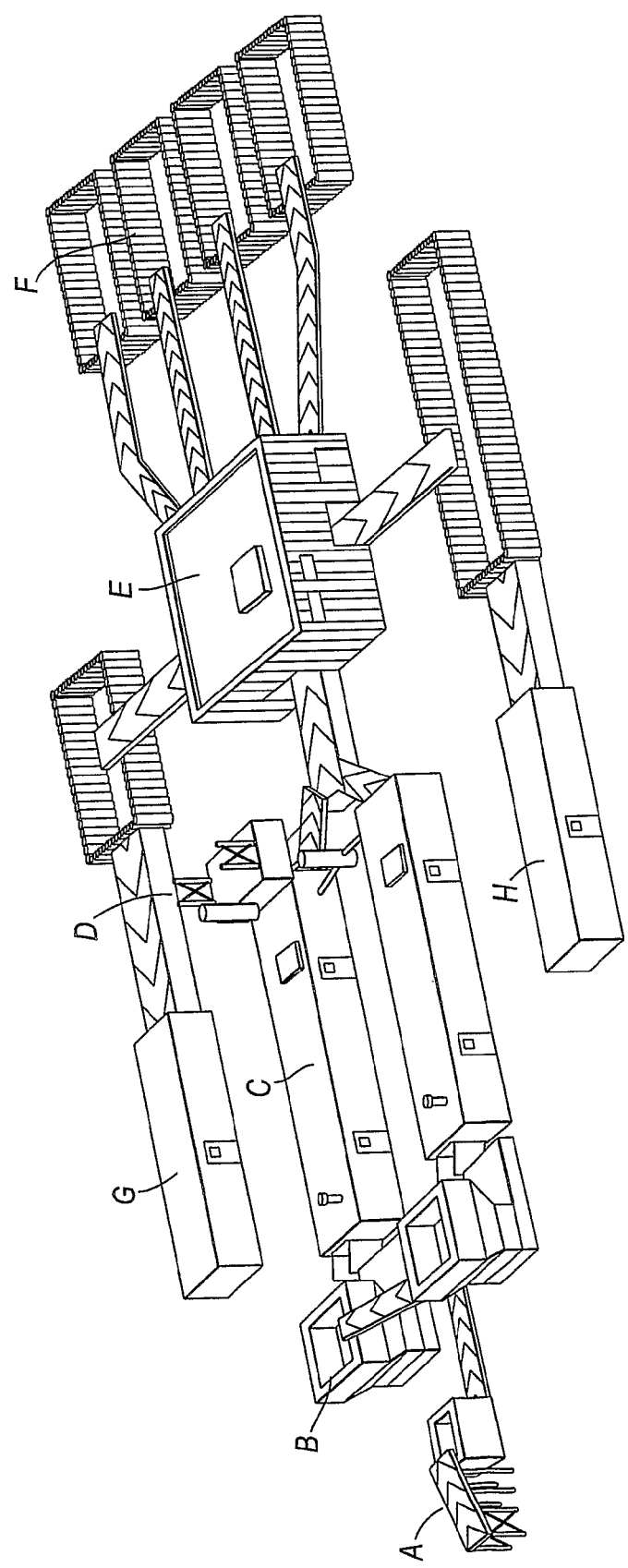
FIG. 1 shows a diagrammatic representation of process plant according to the present invention.

Referring to FIG. 1, this shows diagrammatically the preferred process plant according to the present invention. Refuse vehicles bring municipal domestic waste to a transfer site A where the raw waste, without sorting, is continuously fed via mechanical shredding unit B to a steam treatment unit C. In FIG. 1, there are two steam treatment units operating in parallel each with its own hopper for storing shredded waste prior to it being fed into the unit. By the term 'raw' is meant that no additional matter such as chemicals and/or water is added to the waste prior to being fed into the steam treatment unit(s).

Figure 4:
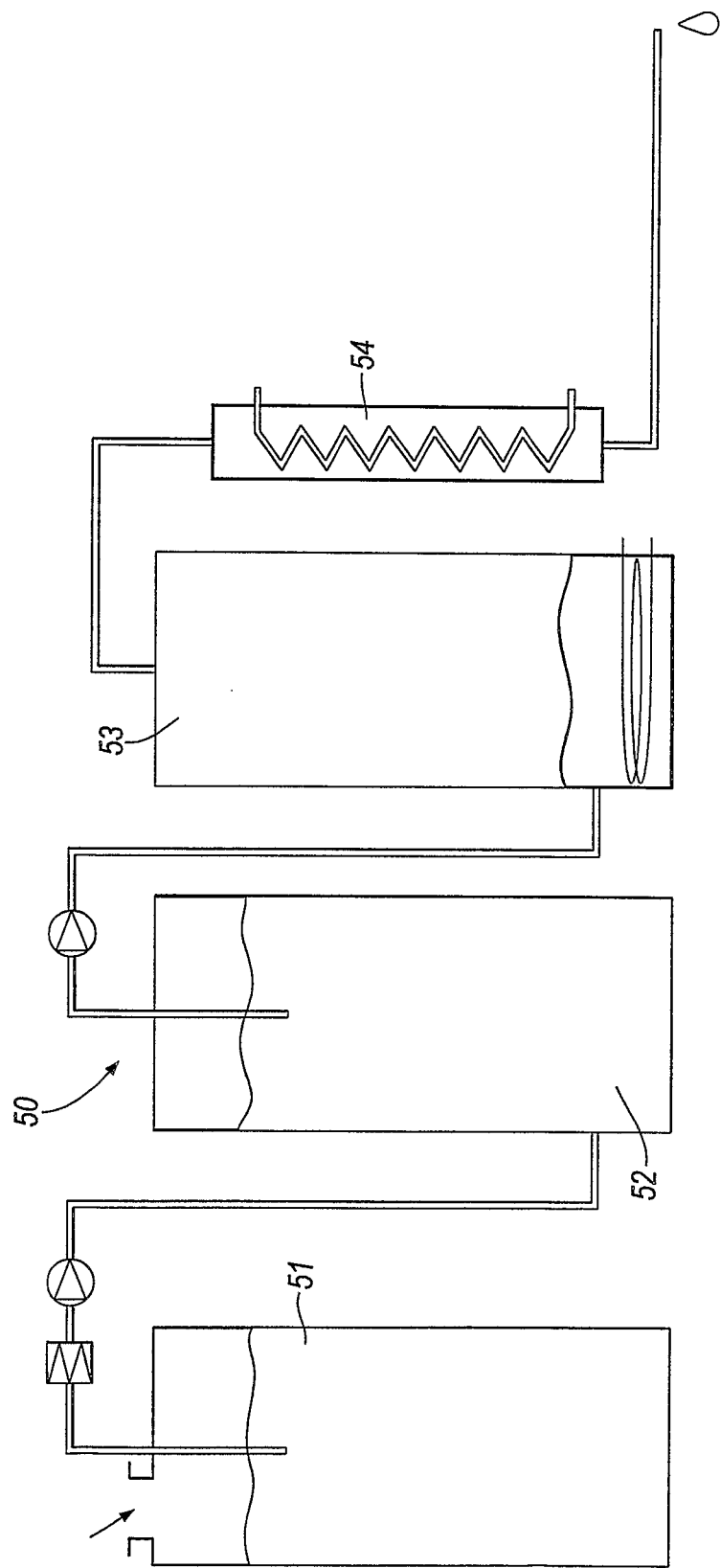
FIG. 4 is a schematic diagram representing the production of ethanol from the system according to the present invention.
Figure 5:
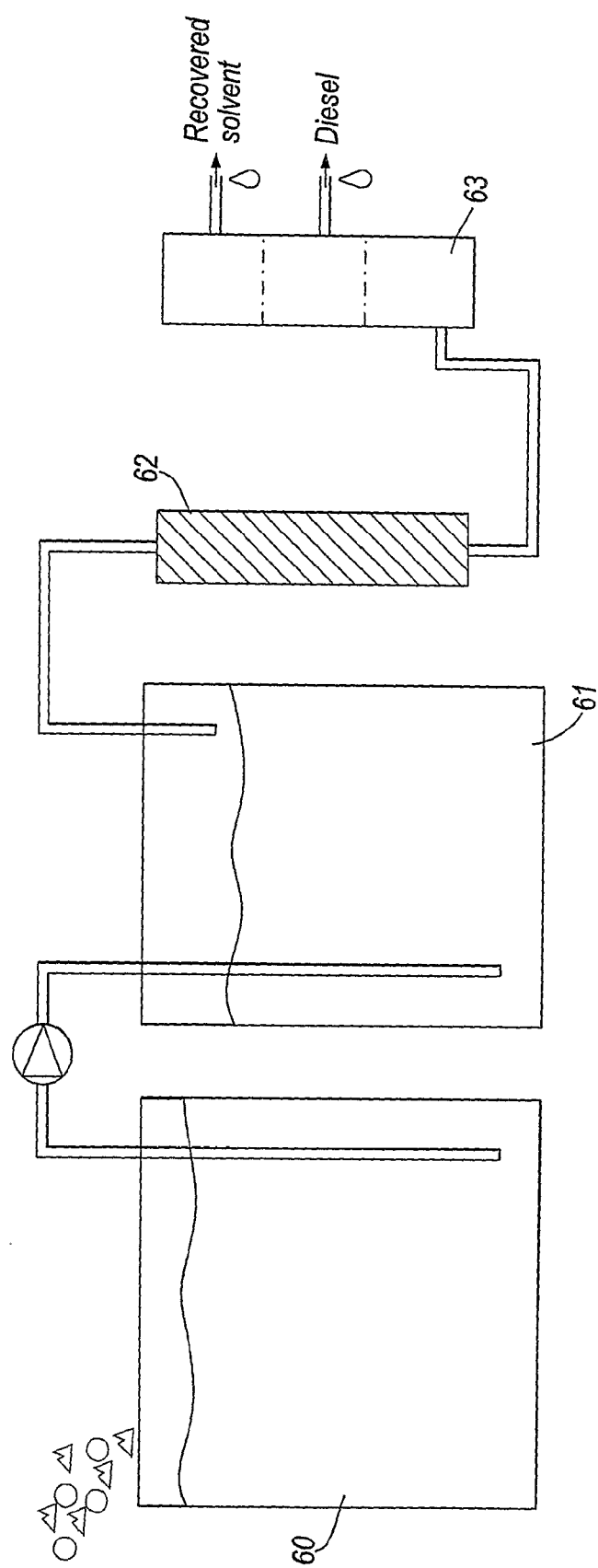
FIG. 5 is a schematic diagram representing the production of diesel from the system according to the present invention.

The steam treatment unit C is operated such that the waste is treated for approximately 45 minutes and the treated waste is then separated at a sorter E into different categories such as raw biomass or cellulose, plastics, ferrous metal, non ferrous metal, textiles and other residues. Utilising this technique, less than 10% by volume of the initial waste is actually sent to landfill and the other sorted waste can be recycled. There is an up to 70% reduction in the volume of waste. The raw biomass and plastics receives further processing indicated by units G and H and/or it may be stored, dried and then fed to a gas converter unit in order to produce gaseous input for a fuel cell which may be used to generate electricity. FIGS. 4 and 5 show alternative processing for the cellulose material or part of it. The other sorted materials are stored as indicated at F.

By its very nature, the waste material will exude unpleasant odours at both the inlet to and outlet from the steam processing unit. For this reason, it is proposed to extract the air from the steam treatment unit and treat it with an odour removal process, as indicated by D in FIG. 1, such as that described in International application no. WO-A-2006/095199 where the air is treated by ozone generated utilising ultraviolet light. A feature of this technique is that if sufficient ozone is generated and kept in contact with the air to be treated for a sufficient period of time, substantial reductions in odour are achieved. This does require, however, that additional ultraviolet light be provided at a different wavelength to that used to create the ozone in order to ensure that no active ozone is present in the air discharged to atmosphere from the process.

Figure 2:
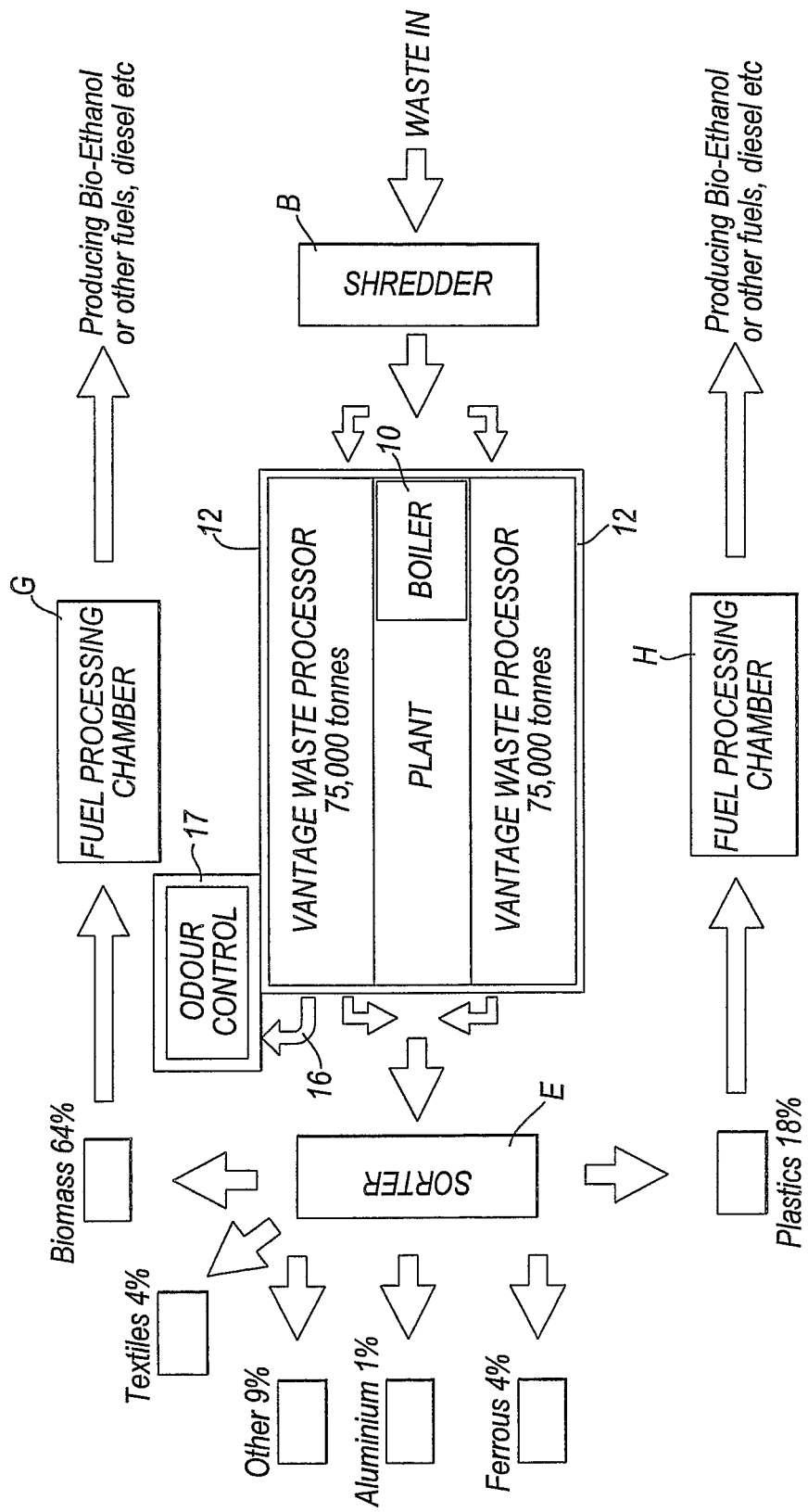
FIG. 2 is a flow chart of the basic process utilized by the present invention.

Referring to FIG. 2, steam is generated in a boiler arrangement 10 which provides steam at 10 bar pressure and has a temperature of between 165° C. and 200° C. which is fed to a steam treatment section 12 which may include one or more individual units operating in parallel. Waste from the reception and feed area represented by the block B is fed to the steam treatment plant. Treated waste is then conveyed to a sorter E.

Additionally, any steam escaping from the steam treatment unit is captured by a ducted system 16 and fed to an odour treatment unit 17 where it is treated as described above prior to being vented to atmosphere.

Figure 3:
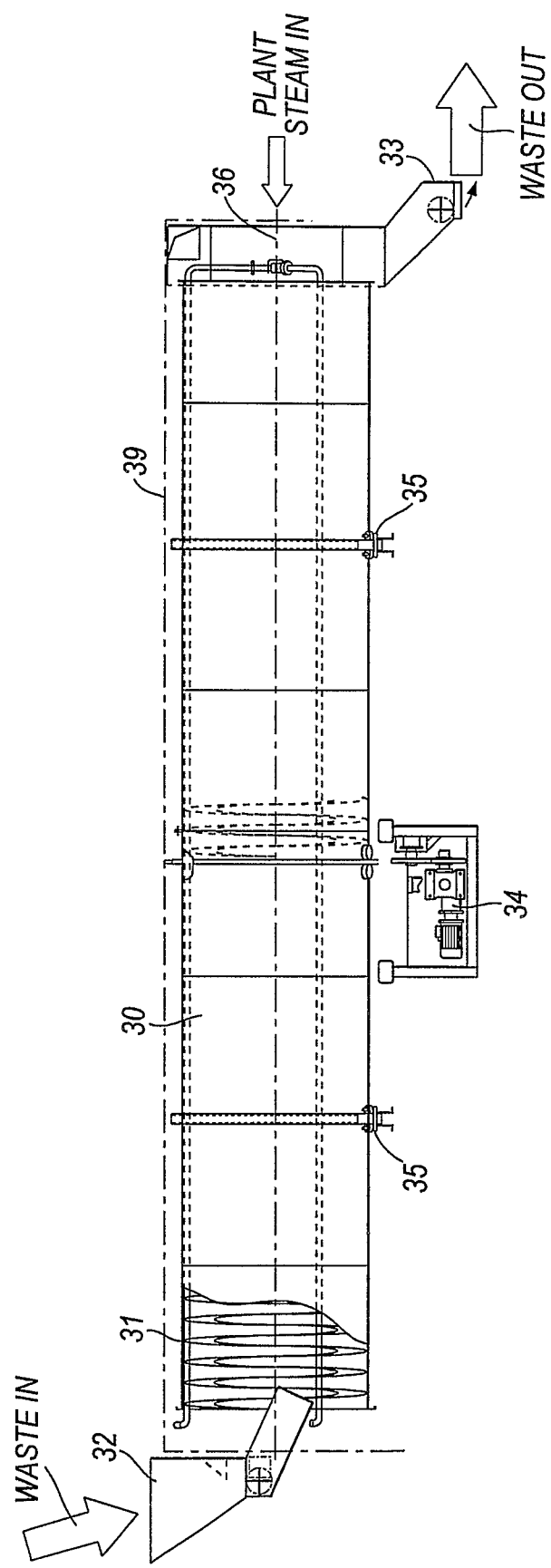
FIG. 3 is a schematic diagram of a steam treatment unit used in the present invention.

Referring now to FIG. 3, this shows in more detail one form of the steam treatment unit of the plant. It comprises an elongate chamber or drum 30 which is substantially sealed and is provided with a conveyor arrangement for moving waste material from an inlet 32 to an outlet 33.

The preferred arrangement, of drum 30 is to make it a rotating drum type of conveyor the internal surface of which is fitted with one or more continuous helical blades. The time during which the waste material is treated is, of course, a function of conveyor rotational speed and conveyor length and these are adjusted such that the waste is treated for approximately 45 minutes.

The waste is treated by using steam and/or water injected into the drum 30 or drum by means of pipes 31. The steam is preferably at 160° C.-180° C. but may be up to 200° C. and the pressure in the drum 30 is above atmospheric pressure but less than 2 bar, preferably at 1.25 bar or, in other words 0.25 bar above atmospheric pressure.

In addition to the inlet and outlet 32, 33, the chamber or drum 30 may be provided with a bottom hopper for the collection and removal of any bottom material resulting from the steam processing. Also, a gas vent may be provided for removal of gasses resulting from the process. These gasses can be cleaned and separated so that useful hydrocarbons can be used in other parts of the plant and/or have any heat energy removed from them and reintroduced into the process.

When the overall processing plant is being used for general waste, it may be necessary to pre-process the waste to render it more uniform in size by means of a shredding or crushing process prior to feeding it to the inlet to the unit. This will ensure that there are no blockages at the inlet to the treatment unit and provide a more consistent product.

The construction of steam processing unit will now be described in more detail with reference to FIG. 3. The steam processing unit comprises a rotable drum 30 horizontally mounted on rollers 35 and arranged to be driven by a chain (not shown) by a motor 34. The drum 30 is of uniform cross-section area throughout its length and is provided on its internal surface with a number of spaced blades. The blades may be formed from a single continuous helical screw member or a number of part-helical blades extending in a helical configuration substantially along the length of the drum 30. If necessary, axially disposed blades may be provided between the turns of helical sections in order to promote lifting and tumbling of the material when loaded into the drum.

Steam is introduced into the drum by a plurality of pipes extending along the length of the drum, in this case these are provided on the internal surfaces of the drum and have apertures centralized in each pitch centre. One end of each pipe is terminated and the other ends of the pipes are bent so that they come together at a union 36 located on the central axis of the drum. The union 36 is connected to a rotary coupling which in turn is arranged to be connected to a supply pipe from a source of steam. The drum may be housed within a container 39 having insulated walls to facilitate heat retention and facilitate vapour collection. The container 39 has an opening at one end opposite to the steam supply end. The opening is arranged to receive a shute where waste material to be treated from a hopper is supplied. The shute is arranged to project through the opening and into the adjacent end of the drum 30 and may be provided with a rotating feed mechanism which maintains a seal between the steam treatment unit and atmosphere. It may also be provided with a baffle so as to direct waste material into the scroll trough formed by the helical or part helical blades. At the other end of the container 39, and which is adjacent to the steam supply, the treated waste material is removed. The end of the drum is located within a shroud which serves to contain the steam within the drum and also serves as the outlet for treated waste. A sealing arrangement can be provided at the outlet in order to maintain an above atmospheric pressure in the drum 30. This may be a rotating mechanism. Usually by operation of the mechanism at the exit from the steam treatment unit and ensuring that the supply shute is always full of material, a pressure above atmospheric pressure can be maintained within the drum 30 without the need to provide a sealable entrance but one can be provided if desired.

When the drum 30 is rotated, in use, at 1-2 revs/min, steam is not only caused to impinge on the surface of the material in the drum but is also injected into the material when it overlies one of the pipes.

The basic process described and shown in FIG. 2 creates a large volume of cellulose material and it is possible to utilise the cellulose material as a fuel for the process plant itself or as a separate product such as bio-ethanol. The cellulose fibre which is output from the steam treatment unit has a gross calorific value of 11 MJ/kg which provides three kW of energy. If dried, the gross calorific value increases to 17 to 18 MJ/kg. This biomass contains virtually no sulphur and thus, when burnt, is much cleaner than fossil fuel. It is thus possible to utilise biomass material resulting from the waste treatment as fuel for the steam boilers. Additionally, or alternatively, the cellulose fibre, could be sold as a commodity or it could be sent to a biomass gasifier which produces gaseous fuel from this cellulose biomass. This gaseous fuel could then be further processed in order to provide the input hydrogen for a fuel cell to produce direct current electrical output. Alternatively, the cellulose material could be further processed as shown in FIGS. 4 and 5 to produce bio-ethanol and diesel prior to any solid residue being processed as described above.

Additionally or alternatively, steam from the steam boilers could be used to drive a steam turbine and generator set and consequently produce electricity in this fashion. The electricity produced by either the above described methods can be used within the process plant or could be sold after the fuel cell output has been converted to alternating current so that it can be connected to the normal power transmission lines.

Turning now to FIGS. 4 and 5, this shows how cellulose material and/or plastics produced from the output from the steam processing may be handled to produce bio-ethanol/diesel.

Dealing firstly with the cellulose material and as indicated in FIG. 4, the biomass is treated in a process generally indicated by the reference numeral 50. Firstly, the biomass is loaded into a tank 51 where it is broken up by adding an enzyme such as *aspergillums* enzyme or using cellulolytic micro-organisms and a nutrient. Additional water may be added. At this stage, active ozone from a generator may be injected into the tank also. The resultant mass is allowed to stand for a period of time and then the liquid is drawn off which will contain soluble sugars. The liquid is then fed to a tank 52 where fermentation takes place by adding yeast such as *saccharomyces cerevisiae* to the liquid and again allowing it to stand for a few hours. The result is a liquid containing ethanol and other products and this liquid is then fed to a distillation process indicated by the reference numeral 53 in order to distill off and collect the ethanol at the output of condenser 54.

Turning now to the plastics material reclaimed from the steam processing, as shown in FIG. 5, this is fed to a tank 60 where a solvent is added and the resultant mixture left to stand in an evaporation tank 61. After a suitable amount of time, the resultant vapour is drawn off through a zeolite catalyst 62 and then distilled in a distillation tower 63 to collect diesel. If desired, ozone may be injected into the tank 60 also.

The ozone injected into the tanks 51 and 60 may be generated by the same generator as is used for removing odours from the air in the vicinity of the steam processing unit and generator or it may be a separate generator or generators.

Additionally, if needed, the air in the vicinity of the ethanol process may be subjected to ozone treatment to remove any excess active ozone remaining in the tanks 51 and 60.

It is also preferable to coat the interiors of some or all of the tanks 51, 52, 60, 61 with an anti-microbial agent. Preferably the agent is one which is non-leaching and non-volatile and is not consumed by microorganisms. Particularly suitable agents are those which are capable of being coated on a surface.

Suitable antimicrobial formulations are those which include, as an active ingredient, a quaternary ammonium salt, preferably a chloride or bromide salt. The nitrogen atom of the salt is preferably substituted by a silane group, preferably a trialkyloxysilane group, most preferably a trimethyloxysilane group. Most preferably the silane group is attached to the nitrogen atom of the salt via a propyl group. The nitrogen atom of the salt is preferably also substituted by three other alkyl groups, at least one of which is preferably methyl, and at least one of which is preferably $C_8$ to $C_{20}$ alkyl. Thus, the preferred compounds have the following general structure:

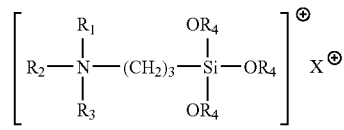

Where: $R_1$ is methyl;
$R_2$ is methyl or $C_8$ to $C_{20}$ alkyl, preferably methyl;
$R_3$ is $C_8$ to $C_{20}$ alkyl, preferably tetradecyl or octadecyl;
$R_4$ is $C_1$-$C_4$ alkyl, preferably methyl; and
X is chlorine bromine, preferably chlorine.

One example of a useful antimicrobial agent incorporates 3-(trimethoxysilyl)-propyldimethyloctadecyl ammonium chloride as the active ingredient. Another example of a useful antimicrobial agent incorporates 3-(trimethoxysilyl)-propyldimethyltetradecyl ammonium chloride as the active ingredient.

The invention claimed is:

1. A process for treating domestic cellulose waste material that includes biomass and plastics, characterized in that it comprises the steps of shredding the material prior to being treated, and separating the biomass and plastics and subjecting the shredded plastics material to steam treatment at a pressure above atmospheric pressure but less than 1 bar above atmospheric pressure and at a temperature of between 150° C. and 200° C. by continuously moving material from one end of a steam treatment unit to the other while agitating the material, and wherein the plastics is converted to diesel fuel by being dissolved in a solvent, the resultant liquid being held in an evaporation container prior to its vapor being passed through a catalyst and distilled to produce diesel fuel.

2. A process according to claim 1, wherein the temperature is between 160° C. and 180° C.

3. A process according to claim 1, wherein the pressure is 0.25 bar above atmospheric pressure.

4. A process according to claim 1, wherein the agitation of the material is achieved by rotating a drum for the material.

5. A process according to claim 1, wherein the biomass is converted to bioethanol by being broken up and the resultant material fermented with a yeast in order to produce a liquid which can be distilled to provide bioethanol.

6. A process according to claim 5, wherein the breaking up of the biomass is achieved using an enzyme.

7. A process according to claim 6, wherein the enzyme is produced by the genus *aspergillus*.

8. A process according to claim 5, wherein the breaking up is achieved using cellulolytic micro-organisms and a nutrient.

9. A process according to claim 5, wherein the yeast is saccharomyces cerevisiae.

10. A process according to claim 1, wherein a portion of the cellulose material is gasified and hydrogen extracted.

11. A process according to claim 10, wherein the hydrogen is fed to a fuel cell to produce an electrical output.

* * * * *